United States Patent [19]

Bland et al.

[11] Patent Number: 5,017,622

[45] Date of Patent: May 21, 1991

[54] SULFONE POLYMER FOAM PRODUCED WITH AQUEOUS BLOWING AGENT

[75] Inventors: David G. Bland, Knoxville, Tenn.; Joseph J. Conte, Newark, Ohio

[73] Assignee: The Dow Chemical Company, Midland, Mich.

[21] Appl. No.: 598,265

[22] Filed: Oct. 16, 1990

[51] Int. Cl.⁵ .............................................. C08J 9/12
[52] U.S. Cl. ........................................ 521/79; 521/81; 521/82; 521/95; 521/97; 521/134; 521/138; 521/139; 521/189
[58] Field of Search ..................... 521/82, 95, 97, 134, 521/138, 139, 189, 79, 81

[56] References Cited

U.S. PATENT DOCUMENTS

| | | | |
|---|---|---|---|
| 4,127,547 | 11/1978 | Smarook | 521/98 |
| 4,179,540 | 12/1979 | Smarook | 521/98 |
| 4,308,352 | 12/1981 | Knaus | 521/95 |

Primary Examiner—Morton Foelak

[57] ABSTRACT

The present invention is directed to foams produced from sulfone polymers and mixtures of sulfone polymers with various non-sulfone polymers. These foams are produced using aqueous blowing agents comprising water as the only blowing agent, or mixtures of water with another blowing agent material.

26 Claims, No Drawings

SULFONE POLYMER FOAM PRODUCED WITH AQUEOUS BLOWING AGENT

BACKGROUND OF THE INVENTION

1. Field of the Invention

The present invention relates to a process for the production of sulfone polymer foams, and more particularly to a process employing aqueous blowing agents for the production of low density polysulfone, polyarylsulfone and polyethersulfone foams, and foams of blends of sulfone polymers with other foamable polymers.

2. Description of the Related Art

Sulfone polymeric materials are known for their useful characteristics as engineering thermoplastics for high temperature applications. Foams from these materials have been made with difficulty since the high temperatures necessary to produce a flowable gel from sulfone polymeric materials causes problems with the usual blowing agents.

One approach to the manufacture of polysulfone foams has been to use volatile organic solvents such as methylene chloride to form flowable compositions which can be foamed. U.S. Pat. No. 4,308,352 discloses a method using this and related organic liquids as solvents and plasticizers and, ultimately, as blowing agents for the manufacture of polysulfone foams.

Another problem in the art associated with solvent type blowing agents is adhesion to various substrates, including those of the processing equipment. The use of various solvents improves mold fill, but this aggravates the adhesion problem. An approach to this problem is disclosed in U.S. Pat. No. 4,1798,540, which employed a very small amount of water in conjunction with a blend of various resins, including polysulfones, and normally liquid organic solvents to form a non-tacky hydrogel dough.

All processes for the production of foams which employ CFC's and related halogenated solvents and blowing agents are under scrutiny today in hopes that the halogenated materials used therein can be eliminated, reduced, or replaced by other materials with lesser environmental impact.

Therefore, it is an objective of the present invention to provide an improved process for the production of foams of sulfone polymers which overcomes the processing problems mentioned above, including high temperature.

Another objective of the present invention is to lessen the environmental impact of the manufacture of sulfone polymer foams through the use of blowing agents with reduced or zero halogen content.

SUMMARY OF THE INVENTION

The present invention relates to the production of sulfone polymer foams in a process which utilizes water as a blowing agent. This is accomplished by forming a flowable gel under conditions of sufficient heat and pressure for the gel to form from a gel forming mixture comprising one or more sulfone polymers and a blowing agent comprising water, and then releasing the pressure to convert the flowable gel into a cellular mass. In another embodiment of the present invention, a blowing agent mixture is used which comprises water and at least a second blowing agent, which is a normally gaseous material or an organic liquid.

DESCRIPTION OF THE PREFERRED EMBODIMENTS

The polyarylene polyether polysulfone thermoplastic resins which are useful in the process of this invention for the production of sulfone polymer foams contain repeating units having the formula

wherein Ar is a divalent aromatic radical containing at least one unit having the structure

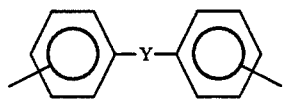

in which Y is oxygen, sulfur or the radical residuum of an aromatic diol, such as 4,4'-bis(p-hydroxyphenyl) alkane. Although the terms polysulfone, polyarylsulfone and polyethersulfone are generic and can be used in a generic sense with no confusion, these terms are also widely used to mean various commercial embodiments of these resins. Therefore, the term "sulfone polymer" is used herein as an all-inclusive generic term. The term "ether" includes both oxygen ethers and sulfur containing thioethers.

Exemplary sulfone polymers include those which have the following units:

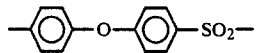

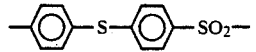

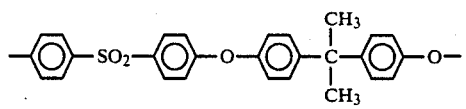

copolymerized units of

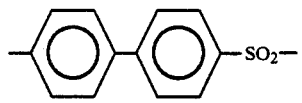

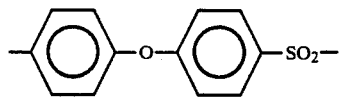

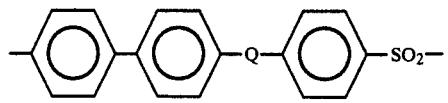

wherein Q is oxygen or sulfur, as well as any combination of these repeating units. Sulfone polymer foams of the present invention can also be produced from blends of two or more sulfone polymers.

The degree of polymerization of these sulfone polymers is sufficiently high so as to afford normally solid thermoplastic resins.

These sulfone polymer resins can be prepared by a substantially equimolar one-step reaction of a double alkali metal salt of a dihydric phenol with a dihalobenzenoid compound in the presence of specific liquid organic sulfoxide or sulfone solvents under substantially anhydrous conditions using an azeotroping solvent such as chlorobenzene. See F. W. Billmeyer, Jr., *Textbook of Polymer Science*, John Wiley & Sons, New York, 1984, and Hans-Georg Elias, *Macromolecules* 2, Plenum Press, New York, 1977, and the references therein.

A useful polyarylene polyether polysulfone thermoplastic resin is one composed of repeating units having the structure shown below:

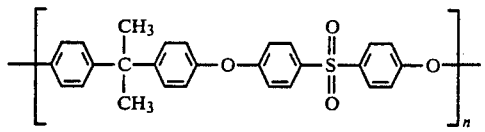

wherein n equals 10 to about 500. This is commercially available from Union Carbide Corporation as UDEL ® Polysulfone P-1700.

Another useful polyarylene polyether polysulfone thermoplastic resin is one composed of repeating units having the structure shown below:

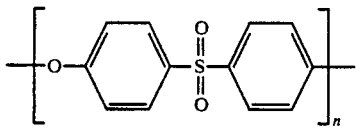

wherein n is from about 10 to about 500. This is commercially available under the tradename Victrex ® from ICI Advanced Materials Group, and under the name Ultrason E ® from BASF.

Another useful polyarylsulfone is commercially available from Amoco Performance Products, Inc. under the tradename Radel ®.

Foams are produced from the above described sulfone polymers and mixtures containing two or more sulfone polymers. Foams may also be produced from mixtures of polymers containing at least one sulfone polymer and at least one non-sulfone polymer. Suitable non-sulfone polymers within the scope of the instant invention include styrene, styrene/alpha-methylstyrene, polyetherimide, polycarbonate, nylon, polyphenylene oxide, polyester terephthalate, polypropylene and polyethylene. Various of these mixtures gave results ranging from poor to excellent depending upon process variables and conditions generally known to those skilled in the art.

The sulfone polymer foams of the present invention are produced in a conventional manner by forming a flowable gel under conditions of sufficient heat and pressure for the gel to form from a gel forming mixture comprising one or more sulfone polymers and a blowing agent comprising water, and then releasing the pressure to convert the flowable gel into a cellular mass. Desirably water used as a blowing agent is present in the gel forming mixture in a concentration from about 1 pph to about 300 pph (parts per hundred by weight based on the weight of polymer), and preferably from about 2 pph to about 25 pph, and more preferably from about 2 pph to about 10 pph.

As is well known in the art, it may be advantageous to add small amountes of various additives for certain purposes either to the polymeric material initially upon its introduction into the processing equipment, or to the gel forming mixture during its preparation. Among the nucleating agents useful in the present invention for the control of the cell size are talc, clay, mica, silica, titanium dioxide, zinc oxide, calcium silicate, metallic salts of fatty acids such as barium stearate, zinc stearate, aluminum stearate, and the like. One or more of these nucleating agents may be present as a finely divided solid in an amount from about 0.01 pph to about 10 pph. It has been found that nucleating agents are important for the production of uniform small cell size in the foams of the present invention.

It has been found that drying the polymer to be used in the foam producing process simplifies handling and transport of the material before the formation of the gel forming mixture. A mixing agent may be used with beneficial results for the mixing and handling of the materials up to the point of expansion of the flowable gel.

In another embodiment of the present invention a blowing agent mixture is employed which comprises water and at least a second blowing agent, which is a normally gaseous material or an organic liquid. For all blowing agent mixtures which contain an organic liquid water is the major component by weight.

Normally gaseous materials useful in the aqueous blowing agent mixtures of the present invention include atomic gases such as helium, neon and argon, as well as simple molecular gases such as carbon dioxide, nitrogen, oxygen and simple molecular organic molecules such as low molecular weight hydrocarbons, and mixtures thereof, such as air and natural gas.

All of the aforementioned materials are intended to be embraced within the term "normally gaseous material" as used herein. This term is intended to mean that the expanding material employed is a gas at the temperatures existing under the normal operating conditions of a plastic extruder. Also, when reference is made to the introduction of a normally gaseous material or a gas into a plastic compound in an extrusion cylinder, it is to be understood that, while the material introduced is a gas at the normal operating temperature of the extruder, it may be in either the gaseous or the liquid state at the temperature and pressure at which it is introduced into the extrusion cylinder. In fact, it is advantageous to employ blowing agents which are liquids when introduced into the extrusion cylinder because it is easier to pump a liquid under constant pressure and volume than it is to supply a gas under constant pressure and volume.

Examples of liquids which may be used as blowing agents in the aqueous blowing agent mixtures of the present invention include hydrocarbons, such as pentane, hexane, heptane, octane; unsaturated hydrocarbons, such as pentene, 4-methyl pentene, hexene; petroleum ester fractions; ethers such as dethyl ester; ketones such as acetone or methyl ethyl ketone; and alcohols such as methanol or ethanol.

In practice, the cellular sulfone polymer bodies of the invention are prepared by placing the molten polymer under pressure into contact with the blowing agent or blowing agent mixture and any other additives, such as by heating the materials in admixture with one another in a pressure-resistant vessel, such as, for example, an extruder, at temperatures between about 200° C. and about 400° C., suitably at a temperature at least as high as the melting point of the polymer, until a uniform or substantially uniform flowable gel is obtained. Pressures employed are in the range from extruded into a zone of sufficiently lower pressure to cause the extruded material to expand with the resultant formation of a cellular polymer mass. The process can be carried out batchwise or in a continuous manner.

The gel is preferably extruded at a temperature near or above the melting point of the sulfone polymer, but higher or lower temperatures can be used. The temperature at which the gel is extruded into a zone of lower pressure will vary depending in part upon the size and arrangement of the apparatus employed, the rate of extrusion of the gel, the melting point of the sulfone polymer and the proportions of the polymer and the blowing agent employed.

In a preferred practice for making cellular sulfone polymer body in a continuous manner, the normally solid polymer, e.g., polysulfone, suitably in dried granular form, is fed to a plastic extruder. Therein it is heat-plastified and blended with the blowing agent under pressure in the desired proportion to form a homogeneous flowable gel. The gel is then brought to a substantially uniform temperature normally between about 200° and 400° C. throughout its mass and is thereafter extruded and discharged through a suitable orifice into a zone of lower pressure, usually the pressure of the atmosphere. The extruded material expands to form a cellular body which is cooled and cut into pieces suitable for convenient handling. In other embodiments the zone of lower pressure into which the foam forming flowable gel is allowed to expand is maintained at a pressure other than ambient pressure in the range from about 0.1 atm to about 10 atm.

The invention provides an improved and economical method for making cellular masses from polysulfone polymers, which cellular material is useful for a variety of purposes, e.g., as insulation, microwave oven food trays, and sound speakers. The products possess a highly uniform fine-cell structure consisting for the most part of thin-walled individually closed cells, and are flexible and tough.

In the following examples, all parts and percentages are on a weight basis based on the weight of the polymer or mixture of polymers unless otherwise indicated. These examples are presented as being merely illustrative and should be understood to have no limiting effect on the scope of the present invention.

EXAMPLES

EXAMPLE 1

Polyethersulfone foam was made from Victrex ™ Polyethersulphone 3600G using water as a blowing agent. Water was present at a concentration of 6 pph. The mixer and other process equipment up to the cooler were operated in the temperature range of from about 285° C. to about 311° C., while the cooler was operated at temperatures from about 225° C. to about 240° C. The die temperature was maintained at about 220° C. Processing pressures before foaming were about 4000 psi. The foam produce was characterized by a large cell size and a honey brown tint, with a density of about 4.6 lb/ft$^3$.

EXAMPLE 2

Polyethersulfone foam was produced in a manner similar to that of the previous example except that water was present at 4 pph, and talc at 0.1 pph and SAIB (90% sucrose acetate isobutyrate and 10% ethanol) at 0.05 pph were added to the mixture. The resulting foam was characterized by a smaller, more uniform cell size than the previous example, and an off-white color, with a density of 5.7 lb/ft$^3$. A second run with water blowing agent present at about 5 pph produced a foam with a density of about 4.4 lb/ft$^3$.

EXAMPLE 3

Polyethersulfone foam was produced in a manner similar to that of the previous examples except that the blowing agent was a mixture of about ⅔ water and ⅓ carbon dioxide, and was present at a concentration of about 5 pph. Also in this experiment the polyethersulfone polymer was dried prior to the process run. The resulting foam was characterized by a uniformly small cell size and an excellent skin which was both smooth and durable. The density was about 5.2 lb/ft$^3$.

EXAMPLE 4

EXPLOSIVE FOAM TECHNIQUE. A weighed sample of Polyethersulfone 3600G was placed in a glass ampule to which a measured amount of blowing agent was added. The ampoule was then sealed off by heating with a torch. The ampoule was placed in an explosion proof tube, which was then heated in an oven for 1.5–2 hours at 250° C. and then for 1–2 hour at 225° C. The final temperature was stabilized and is the foaming temperature. Foaming was initiated by the transmission of a mechanical shock to the ampoule. For some runs this resulted in fracture of the glass ampoule. Runs were made with 4,6,8,10, 15, 20, 50, 100, 150, 200 and 250 pph water as the blowing agent, all of which resulted in the production of foam.

WARNING: Proper safety techniques should be used when using the above procedure to produce foam.

The method of Example 4 was used with various blends of polyethersulfone (PES) mixed with styrene-/alpha-methylstyrene (SAMS), polyetherimide (PEI), polycarbonate (PC), nylon, polyphenylene oxide (PPO), polyesterterephthalate (PET), polypropylene (PPE) and polyethylene (PE). The following Table 1 lists various blends that produced foams, the ratio of the components of the blend, the concentration of water used as a blowing agent and a qualitative evaluation of the quality of the foam based on appearance.

TABLE 1

| FOAMS FROM POLYMER BLENDS | | | |
| --- | --- | --- | --- |
| BLEND | RATIO | PPH WATER | QUALITY |
| PES/PPO | 50/50 | 200 | Poor |
| PES/PC | 50/50 | 200 | Poor |
| PES/PEI | 50/50 | 200 | Fair |
| PES/PEI | 75/25 | 200 | Good |
| PES/NYLON | 50/50 | 200 | Poor |
| PES/NYLON | 75/25 | 200 | Fair |
| PES/SAMS | 50/50 | 200 | Fair |
| PES/SAMS | 50/50 | 100 | Fair |
| PES/SAMS | 50/50 | 50 | Fair |
| PES/SAMS | 50/50 | 25 | Fair |
| PES/SAMS | 75/25 | 200 | Fair |
| PES/SAMS | 75/25 | 100 | Fair |
| PES/SAMS | 75/25 | 50 | Fair |
| PES/SAMS | 75/25 | 25 | Good |

What is claimed is:

1. A process for the production of sulfone polymer foam comprising forming a flowable gel under conditions of sufficient heat and pressure for the gel to form from a gel forming mixture comprising one or more sulfone polymers and a blowing agent comprising water and releasing the pressure to convert the flowable gel into a cellular mass.

2. The process of claim 1 wherein the gel forming mixture comprises at least one sulfone polymer, a blowing agent comprising water and a nucleating agent.

3. The process of claim 2 wherein the gel forming mixture comprises at least one sulfone polymer, a blowing agent comprising water, a nucleating agent and a mixing agent.

4. The process of claim 1 wherein the gel forming mixture comprises a blend of at least two sulfone polymers.

5. The process of claim 1 wherein the gel forming mixture comprises a blend of at least one sulfone polymer and at least one non-sulfone polymer.

6. The process of claim 1 wherein the blowing agent is water present in an amount from about 1 pph to about 300 pph, where pph are parts per hundred by weight based on the weight of polymer.

7. The process of claim 6 wherein the blowing agent is water present in an amount from about 2 pph to about 25 pph.

8. The process of claim 7 wherein the blowing agent is water present in an amount from about 2 pph to about 25 pph.

9. The process of claim 1 wherein the at least one sulfone polymer is a polyethersulfone polymer.

10. The process of claim 1 wherein the at least one sulfone polymer is a polysulfone polymer.

11. The process of claim 1 wherein the at least one sulfone polymer is a polyarylsulfone polymer.

12. A process for the production of sulfone polymer foam comprising forming a flowable gel under conditions of sufficient heat and pressure for the gel to form from a gel forming mixture comprising at least one sulfone polymer and a blowing agent mixture comprising water as a first blowing agent and at least a second blowing agent, and releasing the pressure to convert the flowable gel into a cellular mass.

13. The process of claim 12 wherein the gel forming mixture comprises at least one sulfone polymer, a blowing agent mixture comprising water and at least a second blowing agent, and a nucleating agent.

14. The process of claim 13 wherein the gel forming mixture comprises at least one sulfone polymer, a blowing agent mixture comprising water and at least a second blowing agent, a nucleating agent and a mixing agent.

15. The process of claim 12 wherein the gel forming mixture comprises a blend of at least two sulfone polymers.

16. The process of claim 12 wherein the gel forming mixture comprises a blend of at least one sulfone polymer and at least one non-sulfone polymer.

17. The process of claim 12 wherein the blowing agent mixture is present in an amount from about 1 pph to about 300 pph, where pph are parts per hundred by weight based on the weight of polymer.

18. The process of claim 17 wherein the blowing agent mixture is present in an amount from about 2 pph to about 25 pph.

19. The process of claim 18 wherein the blowing agent mixture is present in an amount from about 2 pph to about 25 pph.

20. The process of claim 12 wherein the blowing agent mixture comprises water and carbon dioxide as a second blowing agent.

21. The process of claim 20 wherein the blowing agent mixture contains water from about 1 pph to about 10 pph and carbon dioxide from about 1 pph to about 10 pph.

22. The process of claim 20 wherein the ratio of water to carbon dioxide is from about 10:1 to about 1:10.

23. The process of claim 12 wherein the blowing agent mixture comprises water and nitrogen as a second blowing agent.

24. The process of claim 23 wherein the blowing agent mixture contains water from about 1 pph to about 10 pph and nitrogen from about 1 pph to about 10 pph.

25. The process of claim 23 wherein the ratio of water to nitrogen is from about 10:1 to about 1:10.

26. The process of claim 12 wherein the blowing agent mixture comprises water as a first blowing agent, carbon dioxide as a second blowing agent and nitrogen as a third blowing agent.

* * * * *